(12) United States Patent
Evans et al.

(10) Patent No.: US 9,291,296 B2
(45) Date of Patent: Mar. 22, 2016

(54) BLOWBACK SHIELD FOR CARBON DIOXIDE DISCHARGE HORN

(71) Applicant: Quark Limited, LDC, Belieze (BZ)

(72) Inventors: Robert B. Evans, Belvidere, IL (US); Robert W. Hallock, Chicago, IL (US)

(73) Assignee: Polar Tech Industries, Inc., Genoa, IL (US)

( * ) Notice: Subject to any disclaimer, the term of this patent is extended or adjusted under 35 U.S.C. 154(b) by 543 days.

(21) Appl. No.: 13/669,647

(22) Filed: Nov. 6, 2012

(65) Prior Publication Data

US 2014/0124591 A1 May 8, 2014

(51) Int. Cl.
*F25D 3/12* (2006.01)
*F16L 57/06* (2006.01)

(52) U.S. Cl.
CPC . *F16L 57/06* (2013.01); *F25D 3/12* (2013.01); *Y10T 137/7043* (2015.04)

(58) Field of Classification Search
CPC ............ F16L 57/06; F25D 3/12; F25D 3/125; F25D 3/14; F25D 3/105; F25D 2331/804; F25D 23/025; F25D 23/026; F25D 2303/08221; F25D 2323/061; A62C 5/004; C01B 31/22; A23L 3/375; A23L 3/363; F17C 2223/0138
USPC .............. 62/54.3, 384, 601, 602; 220/560.03, 220/560.04
See application file for complete search history.

(56) References Cited

U.S. PATENT DOCUMENTS

| | | | |
|---|---|---|---|
| 1,546,682 A * | 7/1925 | Slate | ................................ 62/603 |
| 1,843,397 A | 2/1932 | Marcus et al. | |
| 1,989,874 A | 2/1935 | Marcus et al. | |
| 3,861,168 A | 1/1975 | Sayers | |
| 4,166,364 A | 9/1979 | Ruprecht et al. | |
| 4,374,658 A | 2/1983 | Kawaguchi | |
| 4,415,346 A * | 11/1983 | Love | ................................ 62/603 |
| 4,652,287 A | 3/1987 | Allen et al. | |
| 4,891,954 A | 1/1990 | Thomsen | |
| 5,271,233 A | 12/1993 | Parker et al. | |
| 5,548,974 A | 8/1996 | Rhoades | |
| 6,023,941 A * | 2/2000 | Rhoades | .......................... 62/603 |
| 6,151,913 A * | 11/2000 | Lewis et al. | ...................... 62/603 |
| 6,329,038 B1 * | 12/2001 | Christoffersen | ................ 428/68 |
| 6,427,482 B1 | 8/2002 | Losche et al. | |
| 2002/0124588 A1* | 9/2002 | Quenedey | ........................ 62/371 |
| 2007/0074539 A1 | 4/2007 | Rossewey | |
| 2008/0163628 A1* | 7/2008 | Lilke | ................................ 62/3.6 |

FOREIGN PATENT DOCUMENTS

EP 0854334 A1 7/1998

\* cited by examiner

*Primary Examiner* — Frantz Jules
*Assistant Examiner* — Jose O Class-Quinones
(74) *Attorney, Agent, or Firm* — Knechtel, Demeur & Samlan

(57) ABSTRACT

A device for minimizing the blowback of carbon dioxide snow. Device includes a relatively planar body that includes an aperture for receiving a discharge horn. The discharge horn capable of being connected to a source of carbon dioxide and has an open bottom end for discharging solid carbon dioxide snow through the planar body into a container. The planar body further covering and opening to the container that is to receive the solid carbon dioxide snow with the planar body preventing blowback of solid carbon dioxide snow received into the container from exiting the container. In other words, the planar body acts as a shield against blowback of carbon dioxide snow as device is depositing same in the container.

8 Claims, 4 Drawing Sheets

BLOWBACK SHIELD FOR CARBON DIOXIDE DISCHARGE HORN

CROSS REFERENCE TO RELATED APPLICATIONS

None.

FIELD OF THE INVENTION

The invention relates to a discharge horn for dispensing dry ice, and more particularly, to a blowback shield that connects to a discharge horn.

BACKGROUND OF THE INVENTION

Dry ice snow (also sometimes referred to as $CO_2$ snow) is used for a variety of applications, for example in refrigeration, cooling, and freezing applications. Many of these different applications involve depositing the dry ice snow onto an object for shipping before the object is packaged, or into a package containing an object. In either instance, the dry ice snow keeps the object cold during transportation or shipping.

Many conventional applications utilize dry ice snow dispensers (such as discharge horns or devices with skirts) in fixed positions above a conveyor belt or other means for moving the object/packages. As the objects/packages pass underneath the dry ice snow dispensers, the dispensers deposit the dry ice snow onto the objects or into the packages.

For example, U.S. Pat. No. 4,444,023 discloses a snow horn used in association with a conveyor belt in freezer. In addition, U.S. Pat. No. 4,652,287 discloses a large hood that is used to create a large rectangular area under which dry ice snow can be deposited onto an object.

Some conventional applications utilize a canister or other chamber connected to a $CO_2$ source to make dry ice snow. These devices allow for dry ice snow to be made and deposited into the canister or other chamber, and then manually applied onto objects, into packages, or used as needed. For example, U.S. Pat. No. 5,148,679 discloses an apparatus that can be connected to a $CO_2$ tank to produce dry ice in a bag within a canister. Similarly, U.S. Pat. No. 3,677,020 discloses a valve that can be placed upon a $CO_2$ tank and used, for example, with a hose to produce dry ice snow in a container.

In contrast to those fixed discharge horns, there are known movable or hand held discharge horns. For example, U.S. Pat. No. 6,447,377 discloses a gun shaped handle to be used for a dry ice snow blasting process for cleaning The gun handle is intended to be gripped by only one hand.

While hand held devices are effective at increasing the speed and accuracy of depositing dry ice snow, since the dry ice snow is deposited directly into the intended container, it is possible that the velocity of the dry ice snow and gaseous carbon dioxide mixture is so great that the dry ice snow is blown back towards the source of same and out of the container. Thus, this can create the loss of snow (and increase production costs), as well as create other problems.

The present invention is directed to providing a device that can provide solutions to such a problem, as well as others.

SUMMARY OF THE INVENTION

In one embodiment of the present invention, the present invention provides a device for minimizing blowback of solid carbon dioxide from a discharge horn. Such a device may include a planar body and an aperture in the planar body being capable of receiving a discharge horn.

As used herein, "planar body" is intended to mean a relatively and generally flat body. The body may, and indeed, is contemplated to have sections that are bulbous or create an otherwise "bumpy" surface.

The planar body may include a wall associated with the aperture. The wall is to assist in holding the planar body on the discharge horn. It is further contemplated that a strap is disposed about the wall and an attachment member is associated with an end of the strap for adjusting the size of the wall. Again, this is to better secure the planar body and the discharge horn together.

Since the carbon dioxide snow is cold and is utilized to keep an object cold it is preferred that the planar body comprises a thermally insulating material.

In order to allow the planar body to receive differently sized discharged horns, a gap may be disposed adjacent the aperture. Connection members may be provided for selectively closing the gap.

The planar body may include at least two sections, and each section may include a thermally insulated material. In addition, the planar body may be capable of being folded along a boundary between adjacent sections.

In another embodiment of the present invention, the invention provides a device for producing solid carbon dioxide snow. In this embodiment the device includes, generally, a discharge horn capable of being connected to a source of carbon dioxide, and a planar body removably attached about the discharge horn.

The discharge horn may be hand operated and/or movable. By "hand operated" it is meant that the device for discharging carbon dioxide snow is operated by hand is not meant to necessarily mean a user grasps the discharge horn of the device. By "movable" it is meant that the discharge horn can move in relation to the source of carbon dioxide.

The planar body may include an aperture for receiving the discharge horn, and may further include a gap adjacent the aperture.

The device may also include a strap for removably attaching the planar body to the discharge horn. More particularly, the strap may be disposed about a wall extending upwardly away from the planar body and surrounding a portion of the discharge horn. The strap may include an attaching member for adjusting the size of the wall.

The planar body may include at least two sections, with each section including a thermally insulated material. Again, the planar body may be capable of being folded along a boundary of a section.

A device according to one or more embodiments is beneficial for a variety of reasons.

The planar body acts as a blowback shield and can cover the top of an open container quickly, yet effectively. It does not cover it in a pressure tight manner—which would take time. Rather, the planar body is positioned, with the discharge horn, in or proximate the top of an open container and redirects the flow of carbon dioxide (both gas and solid) back into the container.

Being removably attachable allows for a single discharge horn/carbon dioxide snow device to have multiple uses. Thus, instead of having a separate discharge horn with a shield, and one without, the present invention provides a discharge horn with the shield to be attached only when needed.

The use of thermally insulated material allows for a relatively light weight device and thus does not add unneeded weight to the discharge horn.

These benefits, as well as others, will be readily apparent to those of ordinary skill in the art in view of the following detailed description and attached drawings.

It is to be understood that the aspects and objects of the present invention described above may be combinable and that other advantages and aspects of the present invention will become apparent to those having ordinary skill in the art upon reading the following description of the drawings and the detailed description thereof.

BRIEF DESCRIPTION OF THE DRAWINGS

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION OF THE DRAWINGS

Figure 1:
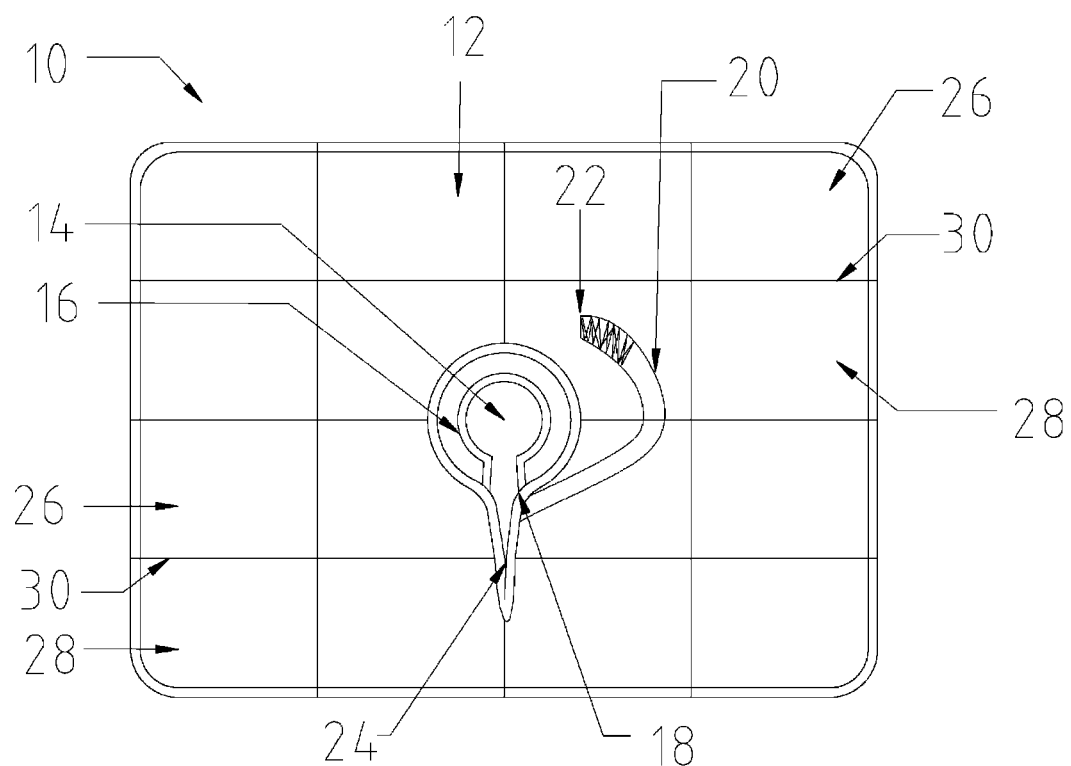
FIG. 1 is a top view of a device according to one or more embodiments of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference throughout this description to features, advantages, objects or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, any discussion of the features and advantages, and similar language, throughout this specification may, but does not necessarily, refer to the same embodiment.

Figure 2:
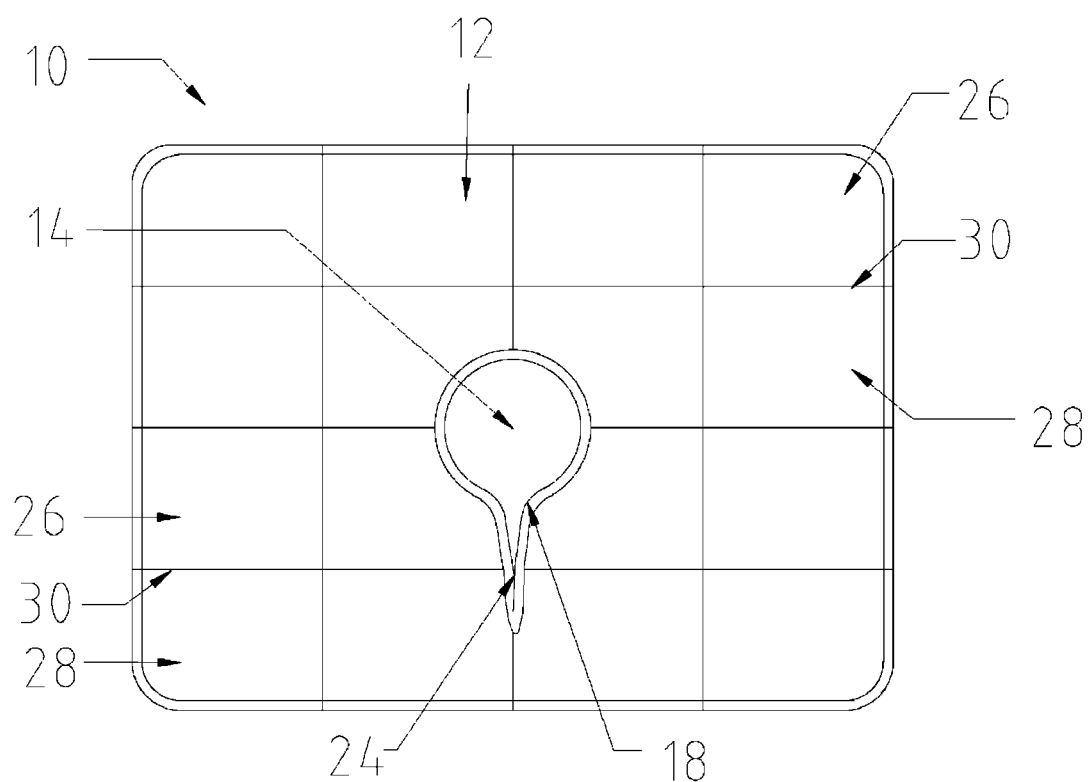
FIG. 2 is a bottom view of the device of FIG. 1.
Figure 3:
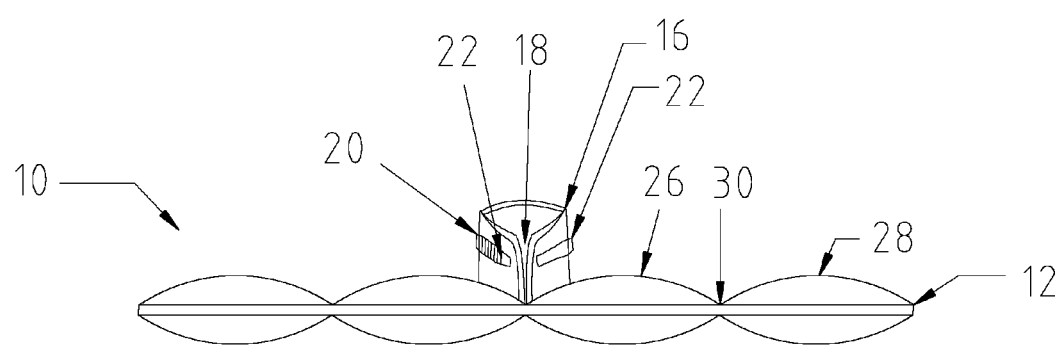
FIG. 3 is an elevated front view of the device of FIG. 1.

As shown in FIGS. 1 through 3, in one embodiment of the invention, the invention provides device 10 which includes planar body 12 and aperture 14. As shown will be discussed in more detail below, aperture 14 is capable of receiving a discharge horn.

Wall 16 may be associated with the aperture 14. A preferred wall 16 includes an open portion 18 which increases the sizes of discharge horns that can fit into aperture 14.

In order to secure discharge horn to device 10, device 10 preferably includes strap 20. As can be seen in FIG. 3, it is preferred that strap 20 wrap around, at least partially wall 16. It is preferred that strap 20 include attachment members 22, which can be snaps, buttons, clips, clasps, hook and loop, or other similar fasteners.

Returning to FIGS. 1 and 2, disposed adjacent aperture 14 may be gap 24. Gap 24 comprises an opening that connects with aperture 14 for accommodating various sized discharges horns. Further, gap 24 can allow a user to view the progress of the carbon dioxide snow deposit. Notwithstanding same, it is contemplated that gap 24 includes connection members for selectively closing same. Connection members can be similar or identical to attachment member 22.

It is preferred that planar body 12 includes at least two sections 26, 28, which may be filled with or made from a thermally insulated material. Boundary 30 separates adjacent sections 26, 28 and may allow for planar body 12 to be folded. This may allow planar body 12 to be easily stored when not in use or folded based upon the size of a container being filled.

Figure 4:
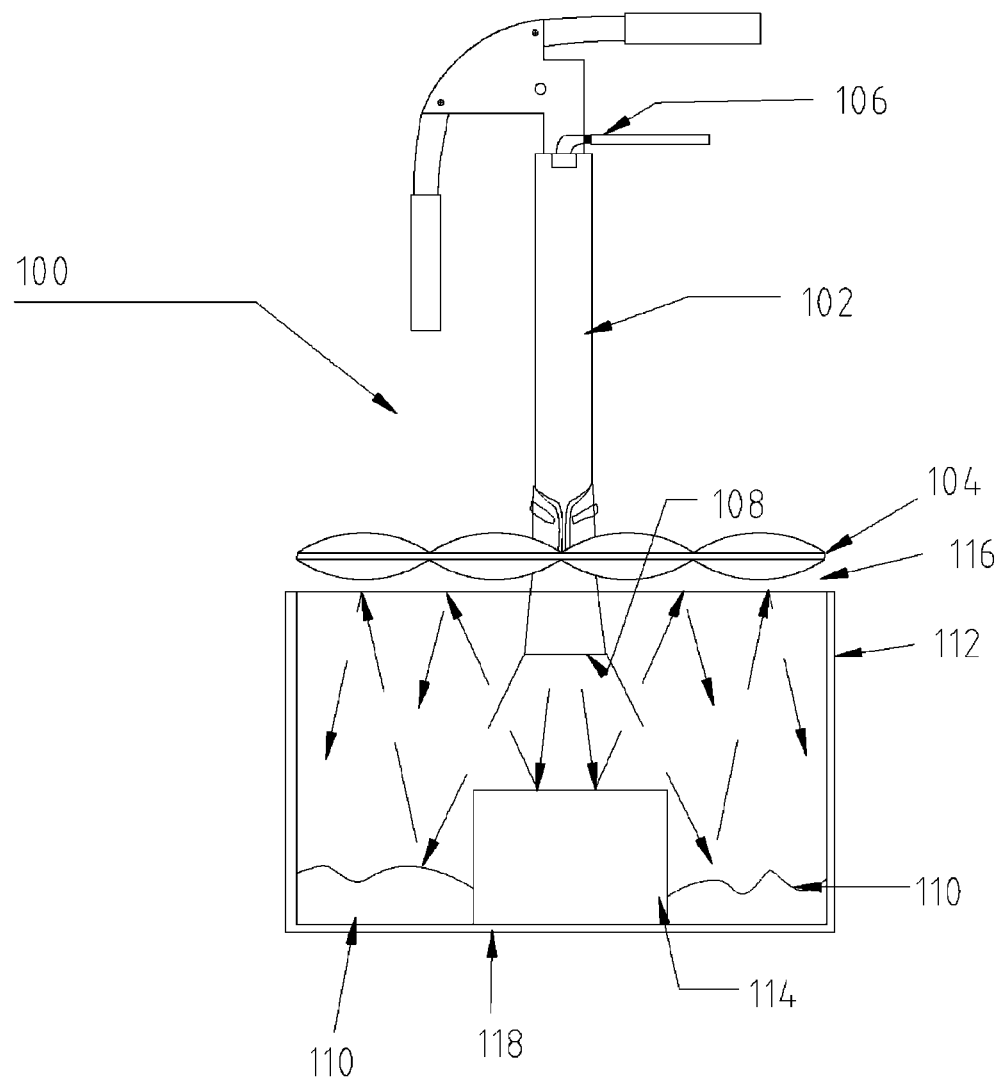
FIG. 4 is an elevated front view of another embodiment of the present invention as being used with a container which is shown in a side cutaway.

Turning to FIG. 4, in an embodiment of the present invention, device 100 is provided which comprises discharge horn 102 and planar body 104. Planar body 104 may be the same or include the same features of planar body 12 shown in FIGS. 1 through 3.

Discharge horn 102 is connected to a source of carbon dioxide (not shown) through conduit 106 and includes open bottom end 108 out of which solid carbon dioxide snow 110 is deposited.

As shown in FIG. 4, device 100 can be position over container 112 containing object 114. As carbon dioxide snow 110 is deposited into container 112 (along dashed lines shown in FIG. 4), some carbon dioxide snow 110 will be carried up back towards the top 116 of container 112. Without planar body 104 of device 100, the carbon dioxide snow 110 would leave container 112; however, as shown in FIG. 4, the carbon dioxide snow 110 is redirected back towards the bottom 118 of container 112. Thus, the loss of carbon dioxide snow 110 is minimized and manufacturing costs/producing costs can be better controlled.

Further, device 100, and more particularly planar body 12, 104 do not need to create a pressurized seal to work and will function by simply being placed over container 112. This speeds up the time needed for production and deposit of the carbon dioxide snow 110. Since planar body 12, 104 may be removable from discharge horn 102, after use it can be removed from discharge horn 102 if needed. Thus, a company need not have various discharge horns, some with shields and some without.

Moreover, the design of aperture 14 allows for various and differently sized discharge horns 102 to be received in aperture 14. For example, the discharge horns depicted in U.S. patent application Ser. No. 13/621,970 (filed on Sep. 18, 2012) and in a co-pending application from the same inventors entitled "FIXED POSITION CARBON DIOXIDE DISCHARGE HORN" (both of which are incorporated herein by reference) can be used in association with planar body 12, 104. Thus, a company need not have a different shield for each different discharge horn.

These and other benefits should be readily apparent to those of ordinary skill in the art.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for producing solid carbon dioxide snow, the device comprising:
   a discharge horn capable of being connected to a source of carbon dioxide and having an open bottom end for discharging solid carbon dioxide snow;
   a planar body removably attached about the discharge horn having a top side, a bottom side, and opposed ends, the top side and the bottom side aligned substantially parallel to one another and situating the planar body in substantially a straight line between the opposed ends, an aperture extending through the planar body from the top side to the bottom side for receiving the discharge horn with the open bottom end of the discharge horn being received through the aperture, the discharge horn capable of being connected to the source of carbon dioxide being located above the top side of the planar body and the open bottom of the discharge horn being located below the bottom side of the planar body;

a container having a bottom and a wall extending upwardly from the bottom defining a hollow compartment and an opening into the hollow compartment;

the planar body having a length along the substantially straight line between the opposed ends for covering the opening to the hollow compartment that is to receive the opposed ends for covering the opening to the hollow compartment that is to receive the solid carbon dioxide snow, the bottom side of the planar body preventing blowback of solid dioxide snow received into hollow compartment from exiting the container; and a strap for removably attaching the planar body to the discharge horn.

2. The device of claim 1 further comprising a wall extending upwardly away from the planar body and surrounding a portion of the discharge horn.

3. The device of claim 2 wherein the strap includes an attaching member for adjusting the size of the wall.

4. The device of claim 1, wherein the planar body includes at least two sections, each section including a thermally insulated material.

5. The device of claim 4 wherein the planar body is capable of being folded along a boundary of a section one of the at least two sections.

6. A device for producing solid carbon dioxide snow, the device comprising:

a discharge horn capable of being connected to a source of carbon dioxide and having an open bottom end for discharging solid carbon dioxide snow;

a planar body having a top side, a bottom side, and opposed ends, the top side and the bottom side aligned substantially parallel to one another and situating the planar body in substantially a straight line between the opposed ends, an aperture extending through the planar body from the top side to the bottom side for receiving the discharge horn with the open bottom end of the discharge horn being received through the aperture, the discharge horn capable of being connected to the source of carbon dioxide being located above the top side of the planar body and the open bottom of the discharge horn being located below the bottom side of the planar body, a wall associated with the aperture and a strap disposed about the wall for removably securing the planar body to the discharge horn; and, the planar body including a plurality of sections, each section including a thermally insulated material and a boundary separating adjacent sections, a container having a bottom and a wall extending upwardly from the bottom defining a hollow compartment and an opening into the hollow compartment;

the planar body having a length along the substantially straight line between the opposed ends for covering the opening to the container that is to receive the solid carbon dioxide snow, the bottom side of the planar body preventing blowback of solid carbon dioxide snow received into the container from exiting the container, and wherein the planar body can be folded along there boundary.

7. The device of claim 6, wherein the discharge horn is hand operated.

8. The device of claim 7, wherein the discharge horn is movable.

* * * * *

UNITED STATES PATENT AND TRADEMARK OFFICE
CERTIFICATE OF CORRECTION

| | | |
|---|---|---|
| PATENT NO. | : 9,291,296 B2 | Page 1 of 1 |
| APPLICATION NO. | : 13/669647 | |
| DATED | : March 22, 2016 | |
| INVENTOR(S) | : Robert B. Evans and Robert W. Hallock | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this
Seventh Day of June, 2016

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 9,291,296 B2 |
| APPLICATION NO. | : 13/669647 |
| DATED | : March 22, 2016 |
| INVENTOR(S) | : Robert B. Evans and Robert W. Hallock |

It is certified that error appears in the above-identified patent and that said Letters Patent is hereby corrected as shown below:

In the Claims:

In column 6, Claim 6, line 32, please delete the word "there" and insert the word --the--.

Signed and Sealed this
Twenty-third Day of August, 2016

Michelle K. Lee
*Director of the United States Patent and Trademark Office*